United States Patent [19]

Yoshida et al.

[11] 4,309,731
[45] Jan. 5, 1982

[54] RECORDING AND PLAYING SYSTEM FOR MAGNETIC TAPE FROM A CASSETTE

[75] Inventors: Masashi Yoshida, Nakaminato; Hideyuki Kawase, Katuta; Tadashi Shinoda, Hitachi, all of Japan

[73] Assignee: Hitachi, Ltd., Tokyo, Japan

[21] Appl. No.: 72,315

[22] Filed: Sep. 4, 1979

[30] Foreign Application Priority Data

Sep. 4, 1978 [JP] Japan ................. 53-107514

[51] Int. Cl.³ .................... G11B 15/66; G03B 1/04
[52] U.S. Cl. ........................... 360/85; 242/198
[58] Field of Search .............. 360/84, 85, 96.5, 73; 242/198

[56] References Cited

U.S. PATENT DOCUMENTS 4,092,684  5/1978  Umeda .................... 360/85
4,138,699  2/1979  Ura et al. ................ 360/85

Primary Examiner—Aristotelis M. Psitos
Attorney, Agent, or Firm—Craig and Antonelli

[57] ABSTRACT

A motor-driven mechanism for pulling magnetic tape from a cassette and winding same around a rotary head cylinder for a circumferential extent of a predetermined angle is utilized for causing the pinch roller to force the magnetic tape against the capstan following tape loading.

7 Claims, 11 Drawing Figures

RECORDING AND PLAYING SYSTEM FOR MAGNETIC TAPE FROM A CASSETTE

BACKGROUND OF THE INVENTION

This invention relates to a magnetic recording and playing system wherein magnetic tape is withdrawn from a cassette and wound around the rotary head cylinder having a built-in rotary head for a circumferential extent of a predetermined angle to effect tape loading, and wherein the pinch roller is caused to force the magnetic tape against the capstan to effect pressing of the pinch roller against the capstan.

In one type of this system known in the art, power is derived from a flywheel for effecting tape loading and pressing of the pinch roller against the capstan. This type of system has had the disadvantages that the mechanism is complex and production cost is high because of the need to effect pressing of the pinch roller against the capstan following magnetic tape loading, and consequently the system lacks reliability in performance due to mechanical failures. To obviate these disadvantages, proposals have been made to carry out pressing of the pinch roller against the capstan by utilizing a reversible motor exclusively used for tape loading. However, in this case, a solenoid or other power source must be used for pressing the pinch roller against the capstan, and this naturally has the disadvantage of increasing the production cost.

SUMMARY OF THE INVENTION

This invention has as its object the provision of magnetic recording and playing system which requires no additional power source, such as solenoid, for pressing the pinch roller against the capstan following tape loading.

The outstanding characteristic of the present invention is that operation of means driven by a motor for effecting tape loading and unloading is utilized for causing the pinch roller to force the magnetic tape against the capstan following tape loading.

DESCRIPTION OF THE PREFERRED EMBODIMENT

Figure 1:
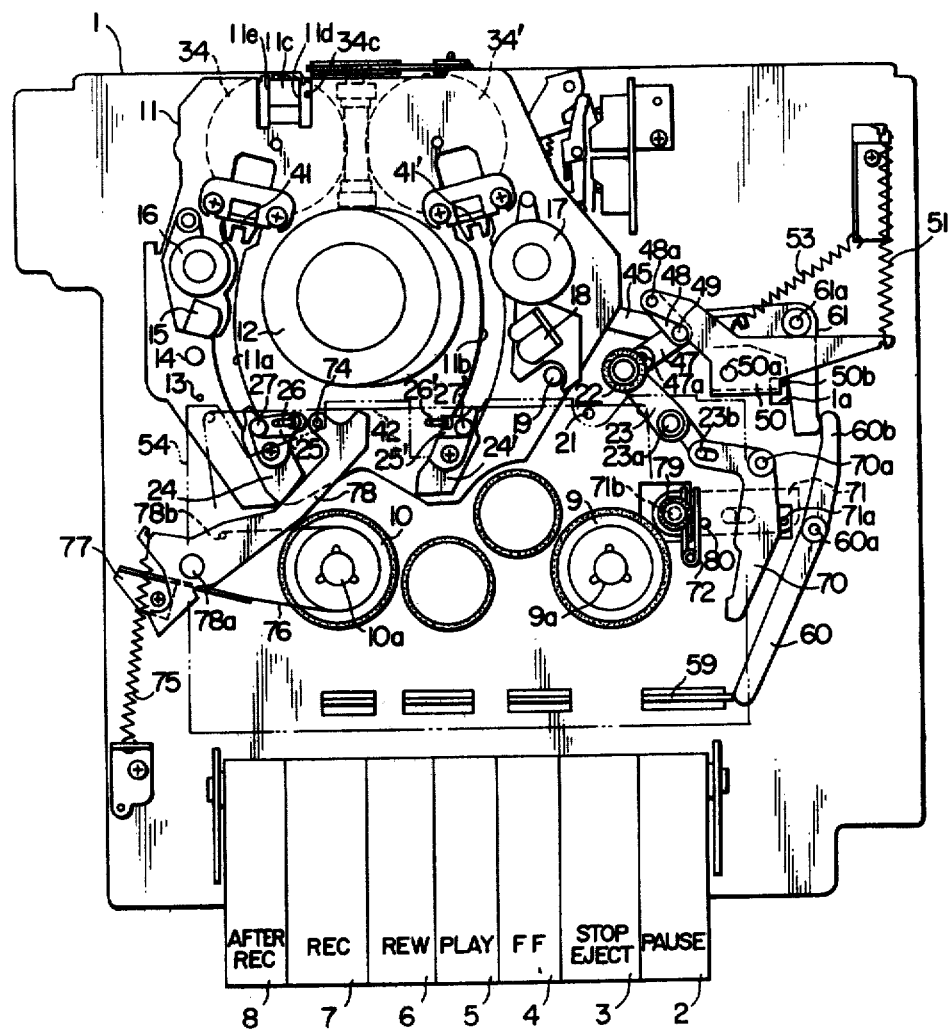
FIG. 1 is a plan view of the magnetic recording and playing system according to this invention, showing the system in an inoperative condition.

A preferred embodiment of the invention will now be described by referring to the accompanying drawings. In FIG. 1, a base plate 1 has reel shafts 9a and 10a secured thereto for rotatably supporting a take-up reel deck 9 and a supply reel deck 10, respectively. A capstan 21 is also rotatably mounted on the base plate 1. A pinch roller 22 is rotatably mounted on a pinch roller arm 23 spaced juxtaposed relation to the capstan 21. The pinch roller arm 23 is pivotally supported on a shaft 23a on the base plate 1. A guide base 11 is supported by posts secured to the base plate 1 so that the guide base 11 is located parallel to the base plate 1. Located in the center of the guide base 11 is a rotary head cylinder 12 supported in a tilted position with respect to the base plate 1 by posts secured to the base plate 1 and extending upwardly through a center opening formed in the guide base 11 so that the rotary head cylinder 12 is also inclined with respect to the guide base 11. Mounted on the guide base 11 are tape guide pins 13 and 14, an erasing head 15, rollers 16 and 17, and audio control head 18 and a tape guide pin 19. Arcuate slots 11a and 11b are formed on opposite sides of the rotary head cylinder 12 in the guide base 11 and symmetrical with respect to the rotary head cylinder 12 for slidably supporting therein guide support platform members 24 and 24' respectively. The guide support platform members 24 and 24' support thereon posts 26 and 26' and columnar guides 27 and 27', respectively, which are inclined and in parallel relation to the outer circumferential surface of the rotary head cylinder 12. The posts 26 and 26' are secured in inclined positions to guide support decks 25 and 25' rotatably supported on columnar portions of the guide support platform members 24 and 24', respectively, and the columnar guides 27 and 27' are fitted by a screw pair in a center opening formed in the columnar portions of the members 24 and 24', respectively. When the magnetic recording and playing system is in an inoperative position, as shown in FIG. 1, the guide support platform members 24 and 24' are disposed at the front ends of the respective arcuate slots 11a and 11b where the members 24 and 24' are juxtaposed against a magnetic tape 42 in a cassette 54 and ready to withdraw the magnetic tape 42. Located at the rear ends of the respective arcuate slots 11a and 11b are locking members 41 and 41' for regulating the positions of the guide support platform members 24 and 24' in the recording and playing mode. Thus, if the guide support members 24 and 24' are moved rearwardly along the arcuate slots 11a and 11b from their positions shown in FIG. 1 when the system is switched on from its inoperative position, then the magnetic tape 42 is withdrawn from the cassette 52, and the magnetic tape 42 is wound around the rotary head cylinder 12 for a circumferential extent of a predetermined angle when the guide support platform members 24 and 24' are brought into engagement with the locking members 41 and 41', respectively.

In FIG. 1, there is also shown a tape tensioning arm 78 which is urged toward the push buttons 2-8 by the guide support platform member 24 when the system is inoperative as shown in FIG. 1. The tape tensioning arm 78 has a pin 74 attached to one end thereof and is pivotally supported at the other end thereof by a pin 78a on the base plate 1. A tension spring 75, normally urging the tape tensioning arm 78 counterclockwise, is mounted between the tape tensioning arm 78 and base plate 1. In FIG. 1, the tension spring 75 is stretched as the tape tensioning arm 78 is pressed by the guide support platform member 24. The tape tensioning arm 78 has a pin 78b secured to its bottom surface in a position near the shaft 78a for supporting one end of a web member 76 for movement. The web member 76, substantially wound semicircularly on the supply reel deck 10, is connected at the other end thereof to the base plate 1 through a mounting plate 77.

Figure 2:
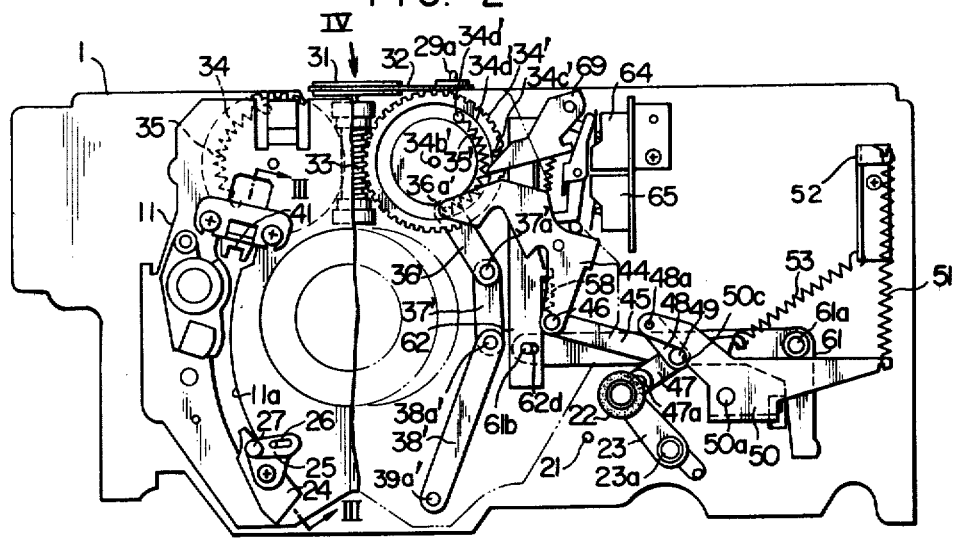
FIG. 2 is a plan view showing the system of FIG. 1, with a substantially half the pushbutton side portion of the base plate and the right half portion of the guide base being removed.
Figure 3:
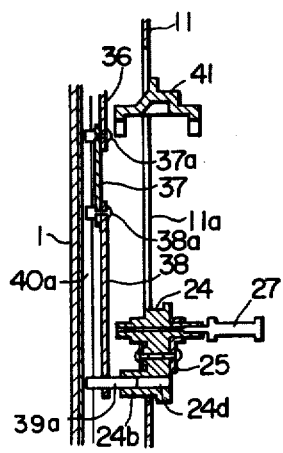
FIG. 3 is a sectional side view taken along the line III—III in FIG. 1.

Tape loading means for moving the guide support platform members 24 and 24' rearwardly from their positions shown in FIG. 1 will now be described. FIG. 2 is a plan view showing the magnetic recording and playing system according to the invention with substantially half the pushbutton side portion of the base plate 1 being removed and with the right half portion of the guide base 11 being cut out. Thus, parts located in the right half portion of FIG. 1 beneath the guide base 11 are shown in FIG. 2. FIG. 3 is a sectional side view taken along the line III—III in FIG. 2, and FIG. 4 is a view of a portion of the system taken in the direction of the arrow IV in FIG. 2.

Figure 4:
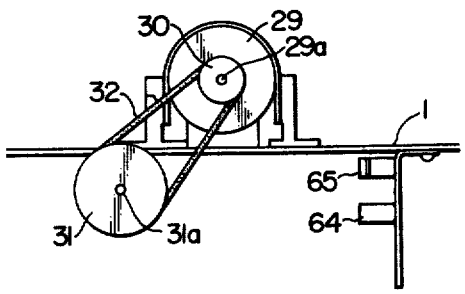
FIG. 4 is a view of a portion of the system taken in the direction of the arrow IV in FIG. 2.

In FIG. 4, the numeral 29 designates a tape loading motor secured to the base plate 1 and includes an output shaft 29a having a motor pulley 30 secured thereto. A belt 32 is trained over the motor pulley 30 and a pulley 31 supported by a shaft 31a secured to the base plate 1. A worm 33 is a unitarily secured to the pulley 31 (See FIG. 2). Meanwhile worm gears 34 and 34', in engagement with the worm 33 and rotatable in opposite directions, are respectively supported by shafts 34b and 34b' on the base plate 1 as shown in FIGS. 1 and 2. Rotation of the worm gears 34 and 34' moves the guide support platform members 24 and 24' to withdraw the magnetic tape 42 from the cassette 54. The relation between the worm gears 34 and 34' and the guide support platform members 24 and 24' will be described. Parts between the worm gear 34 and the guide support platform member 24 are arranged in the same manner as parts between the worm gear 34' and the guide support platform member 34', and these parts are arranged symmetrically with respect to the rotary head cylinder 12. FIG. 2 only shows the parts between the worm guide gear 34' and the guide support platform member 24'. The worm gear 34' is formed therein with an arcuate guide groove 34d' accommodating therein a spring 35' connected at one end to a pin 34a' located in the guide groove 34d' and at the other end to a pin 36a' secured to one end of a link 36' pivotally connected at the other end through a pin 37a' to one end of another link 37'. The link 37' is pivotally connected at the other end through a pin 38a ' to one end of still another link 38' having a pin 39' secured to the other end. FIG. 3 shows links 36, 37 and 38 and pins 37a, 38a and 39a arranged similarly to the links 36', 37' and 38' and the pins 37a', 38a' and 39a'. The pins 37a, 38a and 39a extend downwardly into a U-shaped groove 40a of a guide 40. The U-shaped groove 40a is in spaced juxtaposed to the arcuate slot 11a formed in the guide base 11, as shown in FIGS. 1 and 2, and formed on the base plate 1 in parallel relation to the arcuate slot 11a. The pins 37a', 38a' and 39a' also extend into an arcuate slot 40a' (See FIG. 5). Thus the movement of the links 36, 37 and 38 and 36', 37' and 38' is regulated by the U-shaped grooves 40a and 40a' through the pins 37, 38 and 39 and 37a', 38a' and 39a'. The pin 39a (FIG. 3) also extends upwardly into an opening 24d formed in a lower projection 24b of the guide support platform member 24 on the guide base 11 so that the pin 39a is connected to the guide support platform member 24. The pin 38a' (FIG. 2) is of the same construction and is connected to the guide support platform member 24'.

Thus, rotation of the motor 29 causes the pulley 31 to be rotated counterclockwise by the belt 32 together with the shaft 31a, and the worm 33, coaxial with the pulley 31, also rotates in the same direction, thereby causing the worm gear 34 to rotate clockwise about its shaft 34b and the worm gear 34' to rotate counterclockwise about its shaft 34b'. Thus, the links 36–38 and 36'–38' are driven through the springs 35 and 35', respectively, and the pins 39a and 39a' at the end of the link assemblies, begin to move along the U-shaped grooves 40a and 40a' of the guides 40 and 40', respectively, on the base plate 1. Movement of the pins 39a and 39a' causes the posts 26 and 26' and columnar guides 27 and 27' on the guide support platform members 24 and 24' to engage with the magnetic tape 42 at two points and pull the tape out from the cassette 54 shown in the inoperative position in FIG. 1. The guide support platform members 24 and 24' move along the slot 11a and 11b in the guide base 11, respectively. Movement of the guide support platform member 24 rearwardly from the position shown in FIG. 1 permits the tape tensioning arm 78 to be pivotally moved counterclockwise about its pivot 78a by the biasing force of tension spring 75. Further rearward movement of the guide support platform members 24 and 24' permits the tape tensioning arm 78 to move to a position shown in FIG. 5, so as to regulate the path of travel of the magnetic tape 42. At the same time, the brake force necessary for the recording and playing modes is imparted to the supply reel deck 10 by the web member 76.

Figure 5:
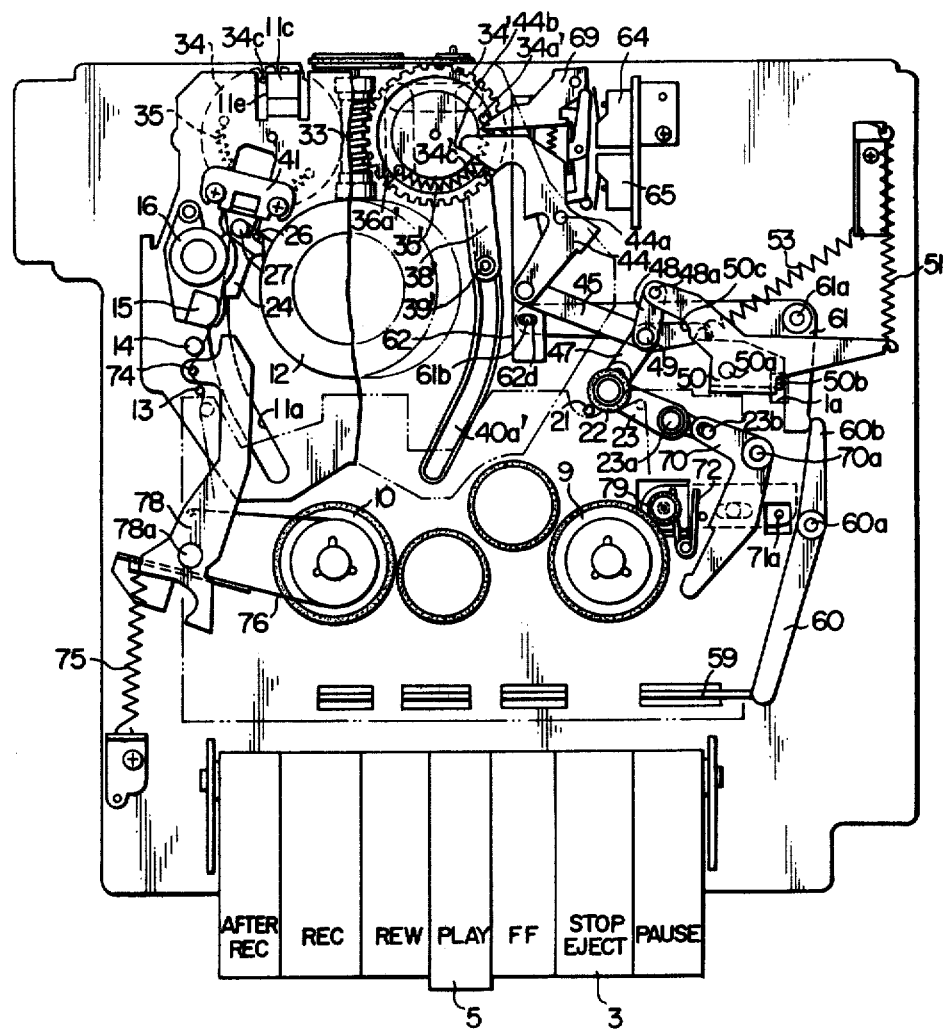
FIG. 5 is a plan view of the magnetic recording and playing system shown in FIG. 1 from which the right half portion of the guide base is removed, showing the system in a recording and playing mode.
Figure 6:
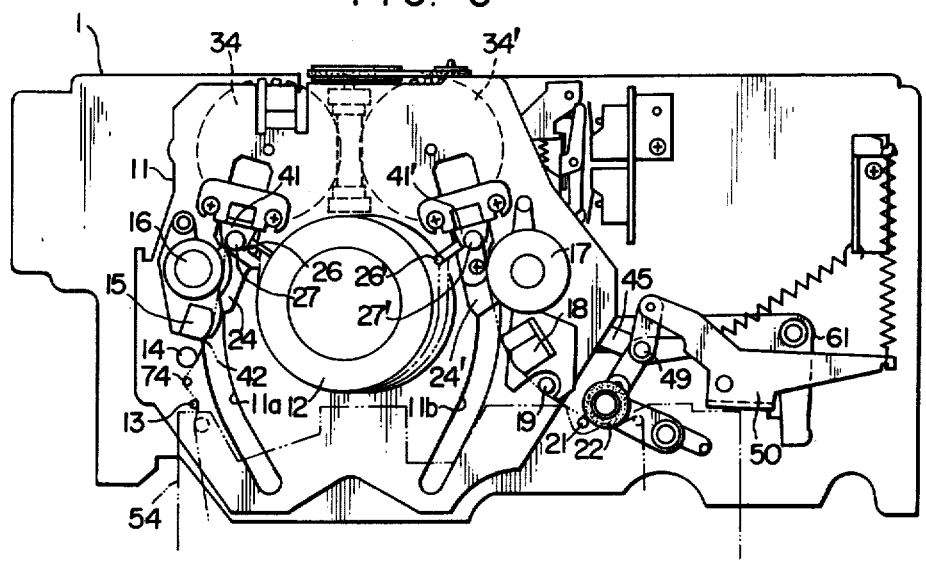
FIG. 6 is a fragmentary plan view of the system shown in FIG. 1, showing the system in a recording and playing mode with the guide base not removed.

With the progress of the operation, the guide 27 and 27' of guide support platform members 24 and 24' are brought into abutting engagement with the locking members 41 and 41', respectively, as shown in FIGS. 5 and 6, so that the positions of the members 24 and 24' are regulated. At this time, the magnetic tape 42 is engaged around the tape guide pins 13, 74 and 14, the erasing head 15 and roller 16 and around the post 26 and columnar guide 27 and wound around the rotary head cylinder 12 for a circumferential extent of a predetermined angle. Then, the tape 42 extends around the post 26' and columnar guide 27', around the roller 17 and audio control head 18 and and around the tape guide pin 19 and capstan 21 into the cassette 54. Further rotation of the motor 29 caused the springs 35 and 35' in the worm gears 34 and 34' to be stretched and the forces of the springs 35 and 35' strongly urge the guides 27 and 27' of the guide support platform members 24 and 24' against the locking members 41 and 41', respectively, to securely hold the guide support platform members 24 and 24' in place.

Motor drive means will now be described. In FIG. 1, arranged in the front edge portion of the base plate 1, are a pause button 2, a stop and ejecting button 3, an FF button 4, a playing button 5, a rewind button 6, a recording button 7 and an after-recording button 8. A slider 59, actuated when the playing button 5 or recording button 7 is depressed, is mounted on the base plate 1 for sliding movement transversely of the base plate 1. The slider 59 is in engagement at its right end with one end of an arm 60 pivotally supported by a pin 60a on the base plate 1. The arm 60 is in engagement at the other end with one end of an arm 61 pivotally supported by a pin 61a on the base plate 1. The arm 61 extends at the other end toward the rotary head cylinder 12 and has a pin 61b attached thereto (FIG. 5) which is received in a slot 62d formed in a slider 62. As shown clearly in a fragmentary enlarged view in FIG. 8, the slider 62 is formed therein with guide slots 62a and 62b which receive therein guide pins secured to the base plate 1 so that the slider 62 is supported for sliding movement longitudinally of the base plate 1. A spring 58, the biasing force of which urges the slider 62 to move downwardly in FIG. 8, mounted between the slider 62 and the base plate 1. The numeral 63 designates a switch base plate secured to the base plate 1 by a bracket 66 and having switches 64 and 65 mounted therein. The switches 64 and 65 are located in a circuit between the motor 29 and a power source. When the switch 64 closes, the motor 29 rotates counterclockwise in FIG. 4; when the switch 65 closes, the motor 29 rotates clockwise.

Figure 8:
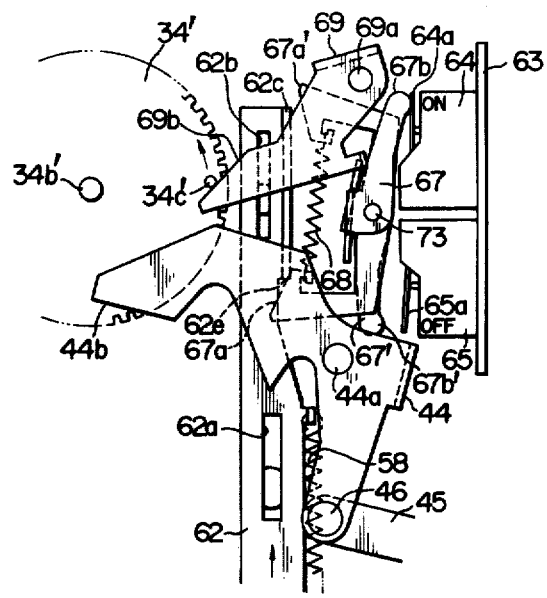
FIGS. 8 to 11 are plan views of the switch opening and closing means, FIG. 8 being a plan view showing the switches being changed to an open position from a closed position and to a closed position from an open position respectively when the system is actuated to start a recording or playing operation, FIG. 9 being a plan view showing the switch opening and closing means during a recording or playing operation, FIG. 10 being a plan view showing the switch opening and closing means when operation of the system is stopped and FIG. 11 being a plan view showing the switch opening and closing means when the system is inoperative.

Means for opening and closing the switches 64 and 65 will be described. As shown in FIG. 8, switch levers 67, 67' are arranged near the slider 62. The switch levers 67 and 67' are of the same shape and are pivotally supported by a pin 73 on the base plate 1. The switch lever 67' is first fitted over the pin 73 and then the switch lever 67 is fitted over the pin 73 in such a manner that the switch levers 67 and 67' extend in opposite directions. At this time, the switch levers 67 is positioned such that one end 67b thereof is capable of depressing an actuator 64a of the switch 64, while the switch lever 67' is positioned such that one end 67b' thereof is capable of depressing an actuator 65a of the switch 65. A spring 68 is mounted between the other end of the switch lever 67 and the other end of the switch lever 67', and the switch levers 67 and 67' are formed therein with tapering portions 67a and 67a' which are positioned such that they can be brought into abutting engagement with rise portions 62c and 62e of the slider 62, respectively.

An arm 69 is pivotally supported by a pin 69a on the base plate 1, and another arm 44 is pivotally supported by a shaft 44a on the base plate 1. Meanwhile, attached to the worm gear 34' is a pin 34c' which is positioned such that it can be brought into abutting engagement with a straight portion 44b of the arm 44 and a tapering portion 69b of the arm 69. Attached to the worm gear 34 (See FIG. 1) is a pin 34c which is positioned such that it can be brought into abutting engagement with opposite side portions 11d and 11e of a downwardly bent portion 11c of the guide base 11. Thus the angle of rotation of the worm gears 34 and 34' is regulated by these pins 34c and 34c'.

Upon depression of the playing button 5 or recording button 7 in FIG. 1, the slider 59 moves rightwardly and causes the arm 60 to move counterclockwise in pivotal movement about the pin 60a. At the same time, the arm 61 is driven by the pin 60b and moves clockwise in pivotal movement about the shaft 61a, so that the pin 61b on the arm 61 pushes the slider 62 shown in FIG. 2. At this time, the rise portion 62c of the slider 62, shown in FIG. 9, pushes the tapering portion 67a' of the switch lever 67, and the switch lever 67' is moved clockwise in pivotal movement about the shaft 73. At the same time, the switch lever 67 is moved clockwise in pivotal movement about the pin 73 by the biasing force of the spring 68 while the tapering portion 67a is being maintained in contact with the rise portion 62e of the slider 62. Thus the switch lever 67 depresses the actuator 64a of the switch 64 and the switch lever 67' releases the pressure from the actuator 65a of the switch 65, to bring the switches 64 and 65 to the conditions shown in FIG. 8 in which the switch 65 is turned off and the switch 64 is turned on, so that a current is passed to the motor 29 to rotate the latter counterclockwise in FIG. 4. The playing button 5 or the recording button 7 is kept in a depressed condition by a locking mechanism, not shown.

Figure 7:
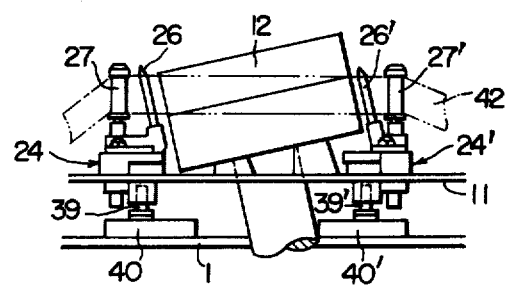
FIG. 7 is a front view of the system shown in FIG. 6.

Thus, depression of the playing button 5 or the recording button 7 shown in FIG. 1 rotates the motor 29 to rotate the worm gear 34 clockwise and the worm gear 34' counterclockwise. The gear 34 and 34' drive the links 36–38 and 36'–38' which, in turn, drive the guide support platform members 24 and 24' in sliding movement along the arcuate slots 11a and 11b, respectively, to the positions shown in FIG. 6 in which a playing or recording operation is to be performed. The magnetic tape 42 is pulled out of the cassette 54 and wound around the rotary head cylinder 12 for a circumferential extent of a predetermined angle as shown in FIGS. 6 and 7.

Means for pressing the pinch roller against the capstan will be described. In FIG. 1, the pinch roller 22 is rotatably supported by one end of the pinch roller arm 23 which is pivotally supported at the other end by the pin 23a on the base plate 1. The pinch roller arm 23 is formed therein with an opening near the pinch roller 22 for receiving therein a pin 47a attached to one end of an arm 47 which is pivotally connected at the other end to a central portion of an arm 45 together with an arm 48 through a pin 49. The arm 48 is pivotally connected at one end to the other end of the arm 47 through a pin 49 and has a pin 48a, pivotally connecting the arm 48 to one end of an arm 50, supported at its central portion for pivotal movement by a pin 50a on the base plate 1. A spring 51 is mounted between the other end of the arm 50 and a bracket 52, secured to the base plate 1, to urge, by its biasing force, the arm 50 to move counterclockwise. The pivotal movement of the arm 50 by the biasing force of the spring 51 is restricted by an introduction of a bent portion 50b of the arm 50 into an opening 1a formed in the base plate 1. Another spring 53 is mounted between one end of the arm 45 and the bracket 52 to urge the arm 45 to move transversely, to thereby bring the connecting pin 49 into pressing engagement with a recess 50c in the arm 50. The arm 45 has attached to the other end a pin 46 through which the arm 45 is pivotally connected to the other end of the loading arm 44.

When the switch 64 is turned on, as shown in FIG. 8 and as noted above, the motor 29 (See FIG. 4) is rotated to rotate the worm gear 34' counterclockwise and to rotate the worm gear 34, shown in FIG. 1, clockwise. Rotation of the worm gears 34 and 34' moves the guide support platform members 24 and 24' along the arcuate slots 11a and 11b to the positions shown in FIG. 6. The guides 27 and 27' abut against the locking members 41 and 41', respectively, to cause the magnetic tape 42 from the cassette 54 to be wound on the rotary head cylinder 12 for a circumferential extent of a predetermined order, thereby completing tape loading. At this time a pin 34c', attached to the worm gear 34', moves counterclockwise from its position shown in FIG. 8 to its position shown by dotted lines in FIG. 9 and slightly pushes the straight portion 44b of the arm 44 to move the same from a dash-and-dot line position to a dash-and-dots line position in FIG. 9. Further counterclockwise movement of the worm gear 34' results in the pin 34c' further pushing the loading arm 44 to move the latter clockwise in pivotal movement about the pin 44a to a solid line position in FIG. 9. As the loading arm 44 moves clockwise as described above, the arm 45 is pulled against the biasing force of the spring 53 as shown in FIG. 5, and the pinch roller arm 23 moves counterclockwise in pivotal movement about the pin 23a to make the angle formed by the arms 47 and 48 substantially 180 degrees, until the pinch roller 22 is brought into engagement with the capstan 21. Further rotation of the worm gear 34' further moves the arm 45, and the arm 50 is moved clockwise in pivotal movement about the pin 50a to slightly stretch the spring 51, so that the pinch roller 22 brings the magnetic tape 42 into pressing engagement with the capstan 21.

Figure 9:
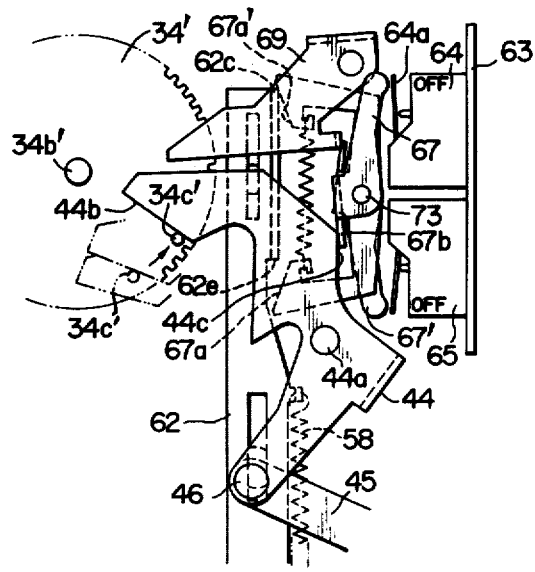

In FIG. 1, a pin 23b, attached to the other end of the pinch roller arm 23, is received in a slot formed in one end of an arm 70 pivotally supported by a pin 70a and engaging at the other end with a pin 71a attached to the right end of an arm 71. A slide in arm 71 is connected to the undersurface of the base plate 1 for movement transversely thereof and a boss 71b is connected to the left end of arm 70 for supporting a take-up roller 79 for rotation. The take-up roller 79 is urged to move toward the take-up reel deck 9 by the biasing force of a spring 72 mounted between the boss 71b and a pin 80 attached to the base plate 1. The take-up roller 79 is spaced apart from the take-up reel deck 9 when the system is inoperative as shown in FIG. 1. Thus, when the pinch roller arm 23 moves counterclockwise in pivotal movement in FIG. 5 as set forth hereinabove, the arm 70 is driven by the pin 23b and moves clockwise in pivotal movement about the pin 70a, so that the arm 70 is released from engagement with the pin 71a. This permits the take-up roller 79 to be moved by the biasing force of the spring 72 toward the take-up reel deck 9, so that the take-up roller 79 is brought into pressing engagement with the take-up reel deck 9 to drive the latter. At this time, the loading arm 44 pushes at its angling portion 44c a projection 67b of the switch lever as shown in FIG. 9 to move the switch lever 67 counterclockwise in pivotal movement about the pin 73. This releases the pressure applied to the actuator 64a of the switch 64, thereby turning off the switch 64 and cutting the supply of current to the motor 29 (FIG. 4). However, the worm gears 34 and 34' further rotate slightly due to inertia in the drive system connected to the motor 29. At this time, a pin 34c attached to the worm gear 34, as shown in FIG. 5, is brought into pressing engagement with the left side 11e of the downwardly bent portion 11c of the guide base 11, to thereby restrict the amount of rotation of the worm gears. Also, the direction of operation of the drive system is not reversed because the worm 33 and the worm gears 34 and 34' are in meshing engagement with each other at a high reduction gear ratio, even if the loading arm 44 turns off the switch 64 to de-actuate the motor 29. Thus the magnetic recording and playing system can be maintained in a recording or playing mode, as shown in FIGS. 5 and 6.

Figure 10:
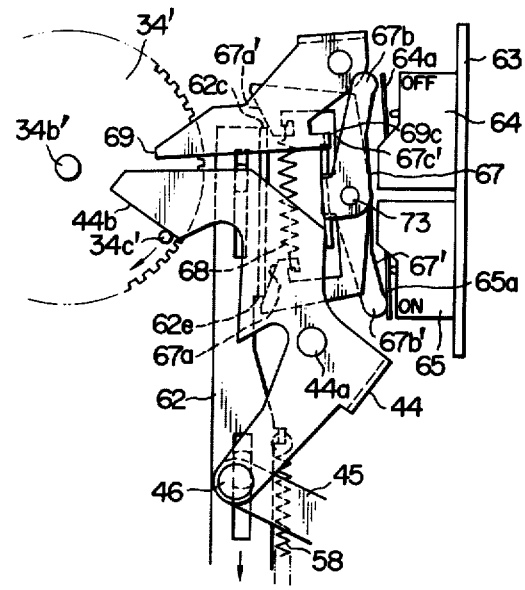
Figure 11:
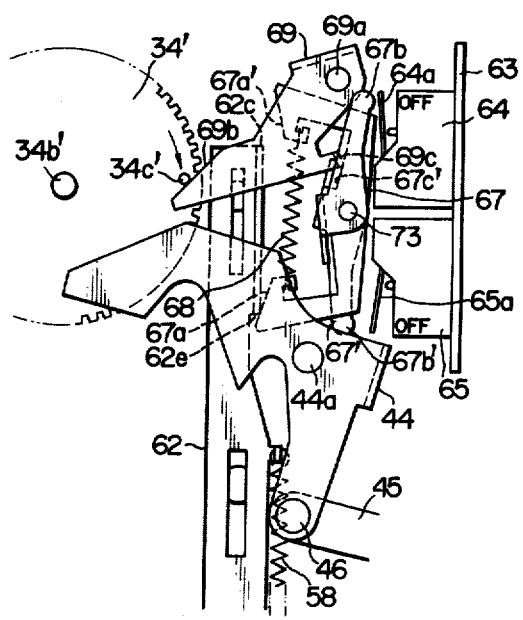

An operation for rendering the magnetic recording and playing system inoperative when the system is in a recording or playing mode will be described. Depression of a stop button 3 in FIG. 5 actuates the button locking mechanism (not shown) to release the pressure applied to the playing button 5 or recording button 7. At the same time, the slider 59 and arms 60 and 61 are released, so that the slider 62 is restored to its original position by the biasing force of the spring 58 (FIGS. 9 and 10), the arm 61 (FIG. 5) moves counterclockwise and the arm 60 moves clockwise in FIG. 2. Meanwhile the raised portion 62c of the slider 62 moves downwardly, as viewed in FIG. 11, so that the switch lever 67' is moved counterclockwise in pivotal movement about the shaft 73 by the biasing force of the spring 68 and pushes the actuator 65a of the switch 65 to turn on the switch 65. This results in the motor 29 rotating clockwise. At this time, the raised portion 62e of the slider 62 is moved substantially downwardly to a position in which it is substantially in abutting engagement with the tapering portion 67a of the switch lever 67. Rotation of the motor 29 drives the worm gears 34 and 34' in FIG. 6, to rotate the worm gear 34 counterclockwise and the worm gear 34' clockwise. Movement of the pin 34c' (FIG. 5) caused by rotation of the worm gear 34' permits the loading arm 44 to be moved counterclockwise in pivotal movement by the biasing force of the spring 53. The arm 50 is moved counterclockwise in pivotal movement by the biasing force of the spring 53, and its downwardly bent portion 50b is engaged in the opening 1a formed in the base plate 1. Further movement of the loading arm releases the pinch roller 22 from pressing engagement with the capstan 21, and the pinch roller 22 is released from the capstan as the angle formed by the arms 47 and 48 becomes lesser. At the same time, the take-up roller 79 is released from pressing engagement with the take-up reel deck 9. By and by, the connecting in 49 is brought into pressing engagement with the recessed portion 50c of the arm 50, thereby terminating the movement of the associated parts.

After the pinch roller 22 is released from pressing engagement with the capstan 21 as described hereinabove, the springs 35 and 35' in the worm gears 34 and 34', respectively, (FIG. 5) are restored to their original positions, and the guide support platform members 24 and 24' (FIG. 6) are released from abutting engagement with the locking members 41 and 41' respectively. Movement of the links 36–38 and 36'–38' causes the guide support platform members 24 and 24' to move forwardly (toward the keys in FIG. 1) along the arcuate slots 11a and 11b on the guide base 11 respectively. At this time, the reel deck 9 or 10 is actuated, by a take-up mechansim (not shown) other than the take-up roller 79, to take up the magnetic tape 42 that has been pulled out of the cassette 54. Meanwhile the tensioning arm 78 is moved clockwise in pivotal movement and slightly displaced by the depression of the stop button 3. However, the tensioning arm 78 is ultimately displaced by the platform member 24 until the tape guide pin 74 is introduced into the cassette 54. The web member 76 releases the brake force applied to the supply reel deck 10. By the time the guide support platform members 24 and 24' are restored to their original positions in which the posts 26, 26' and the columnar guides 27, 27' are positioned in the cassette 54 as shown in FIG. 1, the pin 34c' on the worm gear 34' has pushed the tapering portion 69b of the arm 69 to move the arm 69 counterclockwise in pivotal movement about the shaft 69a in FIG. 11. At this time, the downwardly bent portion 69c of the arm 69 is in abutting engagement with the straight portion 67b' of the switch lever 67' to move the latter clockwise in pivotal movement, thereby releasing the actuator 65a of the switch 65 and turning the latter off. Inertia in the motor 29 and the drive system might cause the worm gears 34 and 34' to further rotate. When the inertia is excessively large, the pin 34c on the work gear 34 is brought into abutting engagement with the right side 11d of the downwardly bent portion 11c of the guide base 11, to thereby restrict the rotation of the worm gear 34.

From the foregoing description, it will be appreciated that according to the present invention the drive actions of the drive means operated by the motor to carry out tape loading are utilized for bringing the pinch roller 22 into pressing engagement with the capstan 21, after the tape loading is completed. Thus the magnetic recording and playing system provided by the invention is simple in mechanism and low in cost. The invention permits pressing of the pinch roller 22 against the capstan 21 to be timed nicely with respect to tape loading. Thus the system is easy to fabricate and reliable in performance.

What is claimed is:

1. A magnetic recording and playing system comprising:
    a motor;
    drive means actuated by a rotational force of said motor, said drive means comprising at least one worm gear driven by said motor;
    tape loading means performing a tape loading operation when said drive means is actuated to pull out magnetic tape from a cassette and wind the magnetic tape around a rotary head cylinder for a circumferential extent of a predetermined angle, said rotary head cylinder having a built-in rotary magnetic head, and said tape loading means comprising at least one movable guide support platform member juxtaposed against the magnetic tape and at least one locking member with which said at least one movable guide support platform member is brought into abutting engagement when said drive means is actuated;
    pinch roller means capable of bringing a pinch roller into pressing engagement with a capstan, said pinch roller being operative to advance the magnetic tape at a predetermined rate, said pinch roller means comprising a pinch roller arm supporting the pinch roller for rotation; and
    means for causing the pinch roller to force the magnetic tape against the capstan, said means connecting said pinch roller means to said drive means to cause the pinch roller to force the magnetic tape against the capstan after tape loading is effected by said tape loading means, and said means for causing the pinch roller to force the magnetic tape against the capstan comprising an actuating member including a pin attached to said at least one worm gear for movement in conjunction with said drive means, a movable arm pushed and moved by said pin after said at least one movable guide support platform member is brought into abutting engagement with said at least one locking member, and a connecting arm connecting said movable arm to said pinch roller arm so that when said movable arm is moved the pinch roller on said pinch roller arm is caused to force the magnetic tape against the capstan.

2. A magnetic recording and playing system as claimed in claim 1, wherein resilient means operatively interposed between said at least one movable support member and said drive means, wherein said at least one locking member is brought into an abutting engagement with said at least one guide support member when said drive means is actuated to move said at least one guide support member to pull the magnetic tape out of the cassette and wind the magnetic tape around the rotary head cylinder for a circumferential extent of a predetermined angle, and wherein said means for causing the pinch roller to force the magnetic tape against the capstan comprises an actuating member moved in conjunction with actuation of said drive means, and said connecting means connecting said actuating member to said pinch roller means, said actuating member being actuated by said drive means after said at least one guide support member is brought into abutting engagement with said at least one locking member, to actuate said pinch roller means whereby the magnetic tape can be forced against the capstan by the pinch roller.

3. An apparatus for recording an reproducing signals on and from a magnetic tape contained in a cassette said apparatus comprising:
    a rotary cylinder with a rotary head incorporated therein;
    a reversible motor;
    a speed-reduction means drivingly connected to the output shaft of said reversible motor to reduce the rotational speed thereof;
    tape loading means operatively associated with said speed-reduction means to draw the tape from the cassette and mount the tape around said rotary head cylinder over a predetermined angle when said reversible motor is rotated in one direction;
    a capstan;
    a pinch roller means including a pinch roller adapted to cooperate with said capstan to feed the tape at a predetermined speed;
    means operatively associated with said speed-reduction means and said pinch roller means to urge said pinch roller into an operative position in which said pinch roller urges the tape against said capstan after the tape has been mounted by said tape loading means around said rotary head cylinder;
    wherein said tape loading means include:
    tape guide means operatively connected to said speed-reduction means and movable between a first position adjacent to the tape in the cassette and a second position adjacent to said rotary head cylinder;
    resilient means between said speed-reduction means and said tape guide means;
    positioning means adapted to be engaged by said tape guide means when said tape guide means have been moved from said first position to said second position to thereby position said tape guide means and the tape relative to said rotary head cylinder; and
    wherein said pinch roller urging means includes means for drivingly connecting said speed-reduction means to said pinch roller means, said connecting means being arranged such that said pinch roller is moved into said operative position after said tape guide means have been moved to said second position and engaged with said positioning means.

4. The apparatus according to claim 3, wherein said speed-reduction means includes a worm drivingly connected to the output shaft of said reversible motor and at least one worm gear in meshing engagement with said worm, said pinch roller means comprising an arm carrying said pinch roller rotatably mounted thereon, said pinch roller arm being pivotally movable about an axis between a first position in which said pinch roller is spaced from said capstan and a second position in which said pinch roller is positioned in said operative position, said connecting means comprising a link motion having a first end operatively associated with said worm gear and a second end operatively connected to said pinch roller arm, so that after said tape guide means have been moved to their second position and engaged with said positioning means, said worm gear is drivingly connected to said first end of said link motion so that said link motion is actuated by said worm gear to move said pinch roller arm to its second position.

5. The apparatus according to claim 4, wherein said at least one worm gear carries a pin secured thereto and said first end of said link motion is positioned relative to said worm gear so that said pin is brought into engagement with said link motion first end to actuate said link motion for thereby moving said pinch roller to its operative position after said tape guide means have been moved to their second position and engaged with said positioning means.

6. The apparatus according to claim 4 or 5, wherein said speed-reduction means includes a pair of worm gears disposed in opposite relationship with respect to said worm, said resilient means comprising spring members each having one end connected to one of said worm gears, the other ends of said springs being connected to said tape guide means whereby the rotation of said worm gears are transmitted through said springs to said tape guide means.

7. An apparatus according to claim 5, further including a switch means for controlling the direction of said motor, said switch means being operatively connected to said pin of said worm gear by a lever mechanism so that rotation of the worm gear results in the pin operating the lever mechanism causing the switch means to rotate the motor in the direction for loading or unloading the tape.

* * * * *